(12) United States Patent
McKeirnan, Jr.

(10) Patent No.: US 9,234,542 B2
(45) Date of Patent: *Jan. 12, 2016

(54) BEARING SYSTEM

(71) Applicant: Alpha Turbo Technologies, LLC, Westlake Village, CA (US)

(72) Inventor: Robert D. McKeirnan, Jr., Westlake Village, CA (US)

(73) Assignee: Alpha Turbo Technologies, LLC, Westlake Village, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/292,518

(22) Filed: May 30, 2014

(65) Prior Publication Data

US 2014/0270614 A1    Sep. 18, 2014

Related U.S. Application Data

(63) Continuation-in-part of application No. 13/468,943, filed on May 10, 2012, now Pat. No. 8,740,465, which is a continuation-in-part of application No. 12/423,326, filed on Apr. 14, 2009, now Pat. No. 8,186,886, which is a continuation of application No. 11/456,667, filed on Jul. 11, 2006, now Pat. No. 7,517,154, which is a continuation-in-part of application No. 11/202,448, filed on Aug. 11, 2005, now Pat. No. 7,371,011.

(51) Int. Cl.
| | |
|---|---|
| F16C 25/06 | (2006.01) |
| F16C 19/54 | (2006.01) |
| F01D 25/16 | (2006.01) |
| F01D 25/18 | (2006.01) |
| F16C 33/66 | (2006.01) |
| F16C 35/077 | (2006.01) |
| F16C 19/16 | (2006.01) |
| F16C 25/08 | (2006.01) |

(52) U.S. Cl.
CPC ............ *F16C 19/547* (2013.01); *F01D 25/16* (2013.01); *F01D 25/18* (2013.01); *F16C 19/163* (2013.01); *F16C 25/08* (2013.01); *F16C 33/6659* (2013.01); *F16C 35/077* (2013.01); *F05D 2220/40* (2013.01); *F05D 2240/52* (2013.01); *F05D 2250/611* (2013.01); *F05D 2260/38* (2013.01); *F16C 2360/24* (2013.01)

(58) Field of Classification Search
CPC ............ F16C 2360/24; F16C 19/547; F16C 33/6659; F16C 35/077; F16C 19/163; F16C 25/08; F01D 25/16; F01D 25/18; F05D 2240/50; F05D 2240/52
See application file for complete search history.

(56) References Cited

U.S. PATENT DOCUMENTS

| | | |
|---|---|---|
| 3,574,424 A | 4/1971 | Hagemeister |
| 3,890,780 A | 6/1975 | Hagemeister et al. |

(Continued)

*Primary Examiner* — Thomas R. Hannon
(74) *Attorney, Agent, or Firm* — Lowry Blixseth LLP; Scott M. Lowry

(57) ABSTRACT

The improved bearing system includes an inner cartridge and an outer cartridge having respective bearing units configured to be mountable to a common axial shaft. A drain port is formed in the outer cartridge for discharging excess oil from the bearing system. An annular channel is generally formed from one of the cartridges for selectively receiving a preload ring. An annular groove is formed from a portion of the other cartridge and sized to slidably receive the preload ring. A preload element is disposed within the annular groove and axially compressed between a preload surface of the annular groove and the preload ring. The preload element maintains a simultaneous axial preload thrust on the bearing cartridges and respective bearing units in inwardly opposite axial directions.

20 Claims, 7 Drawing Sheets

(56) References Cited

U.S. PATENT DOCUMENTS

| | | |
|---|---|---|
| 4,676,667 A | 6/1987 | Komatsu et al. |
| 4,708,602 A * | 11/1987 | McEachern et al. .......... 417/407 |
| 4,721,441 A * | 1/1988 | Miyashita et al. ............ 417/407 |
| 4,789,253 A * | 12/1988 | Perego .......................... 384/517 |
| 4,961,654 A | 10/1990 | Pangburn et al. |
| 5,388,917 A | 2/1995 | Hibi et al. |
| 5,899,574 A | 5/1999 | Chujo |
| 6,739,845 B2 | 5/2004 | Woollenweber |
| 6,877,901 B2 | 4/2005 | Wollenweber |
| 8,740,465 B2 * | 6/2014 | McKeirnan, Jr. ............. 384/519 |
| 2004/0200215 A1 | 10/2004 | Woollenweber et al. |

* cited by examiner

BEARING SYSTEM

BACKGROUND OF THE INVENTION

The present disclosure generally relates to improvements in bearing systems for use in high speed rotating machinery or turbomachines. More particularly, the invention relates to an improved bearing system having a high speed rotary shaft supported by a pair of angular contact bearings subjected to a constant axial thrust preload.

There are generally two types of turbomachines that include "open" turbomachines (e.g., propellers or windmills) and "closed" turbomachines (e.g., vehicle turbochargers). Open turbomachines operate on an infinite amount of fluid, such as water or wind. On the other hand, closed turbomachines operate on a finite quantity of fluid as it passes through a housing or casing. Vehicle turbochargers, for example, typically operate as closed turbomachines wherein a centrifugal compressor is powered by a turbine driven by the exhaust gases emitted from the vehicle engine as part of the combustion cycle. Of course, turbomachines, and more specifically turbochargers, are not necessarily limited in application to vehicles. In essence, turbomachines and turbochargers may be used in a wide variety of applications wherein it may be desired to harness energy from byproducts of the combustion process, such as the combustion gases.

More specifically, turbochargers are well known in the art for use in supplying charge air under pressure to an internal combustion engine for the purpose of increasing engine performance. Such turbochargers generally have a turbine wheel and a compressor wheel or impeller mounted on a common shaft supported by suitable bearings for high speed rotational operation. The turbine wheel is positioned within a turbine housing shaped for flow-through passage of engine exhaust gases which rotatably drive the turbine wheel at a relatively high speed. The thus-driven shaft and associated bearings are typically mounted within a so-called center housing disposed between the turbine housing and a compressor housing having the compressor impeller therein. Accordingly, the exhaust-gas driven turbine wheel rotatably drives the compressor wheel which draws in and compresses ambient air to provide pressurized charge air to the associated internal combustion engine.

Significant design and development effort has focused upon the turbocharger shaft bearings in attempts to provide reduced bearing friction losses in combination with smooth and substantially vibration-free shaft rotation in a bearing configuration that is compatible with the relatively high speed and temperature transient conditions of a turbocharger operating environment. In this regard, numerous configurations have been proposed for oil-lubricated sleeve-type journal bearings such as floating bushings mounted generally at opposite ends of the turbocharger shaft at locations generally and respectively adjacent the turbine and compressor housings. Such sleeve-type bearing systems have additionally required a separate thrust bearing typically in the form of a radial collar on the rotating turbocharger shaft to sustain axial loads during operation. However, such collar-style rotating thrust bearings have been associated with substantial friction losses.

In recent years, improved turbocharger bearing systems using improved anti-friction ball bearings have been proposed. In this regard, angular contact ball bearings have been suggested wherein a pair of angular contact ball bearing units is provided for supporting opposite ends of the high speed turbocharger shaft. See, for example, U.S. Pat. Nos. 6,739, 845, 6,877,901, and 7,025,579, all of which are herein incorporated by reference. In such designs, the turbine-end and compressor-end ball bearing units are mounted within a common, generally cylindrical bearing carrier, and are respectively designed to carry thrust loads acting in opposite axial directions, namely, an inboard direction (i.e., with the thrust loads acting axially toward each other). Accordingly, the pair of angular contact bearing units provides both rotary and thrust bearing functions. At least one of the angular contact ball bearing units is further associated with a spring or tolerance ring for applying an axial outboard-directed thrust preload force to the associated bearing unit outer race, thereby accommodating at least some axial migration of the outer race relative to the bearing carrier in response to thermal transients and the like.

One important aspect of the bearing system in turbochargers is increasing the life of the ball bearing units. Turbochargers that use oil journal bearings are susceptible to failure when exposed to high thrust loads, harsh diesel engine applications, hot end thermal soak back that causes coking of the oil local to the oil journal bearings, and irregular oil changes. With internal combustion engines increasing in performance and efficiency, an improvement in the durability and efficiency of the turbocharger unit is becoming a requirement. To address this requirement, ball bearings have become a preferable use in turbochargers to increase durability. A turbocharger equipped with properly sized ball bearings will oftentimes see improvements in time to boost, radial and axial load capacity, tighter rotating clearances among components (resulting in improved turbocharger efficiency), increased tolerance to oil maintenance intervals, transient operating conditions, and thermal soak back in the hot section of the turbocharger.

Thus, there exists a constant need in the art for an improved bearing system that includes a pair of axially split and generally cylindrical cartridges having respective bearing units configured to be mountable to a common axial shaft, wherein such cartridges and bearing units are subject to a mechanical or fluid-based axially inboard-directed thrust preload to increase the operating efficiency and durability of the bearing units. The present invention fulfills these needs and provides further related advantages.

SUMMARY OF THE INVENTION

The improved bearing system disclosed herein includes an inner cartridge and an outer cartridge each having respective bearing units configured to be mountable to a common axial shaft. Preferably, a drain port is formed in the outer cartridge for discharging excess oil therefrom. An annular channel is generally formed from one of the cartridges for selectively receiving a preload ring. An annular groove couples to the other cartridge and is sized to slidably receive the preload ring. A preload element is disposed within the annular groove and axially compressed between a preload surface of the annular groove and the preload ring. The preload element maintains a simultaneous axial preload thrust on the bearing cartridges and respective bearing units in inwardly opposite axial directions. Here, the axial preload thrust includes an inboard axial preload thrust. The aggregate axial preload thrust is a function of displacement of the axial cartridges relative to an opposite compressive force acting on an outer cartridge axial thrust load surface and an inner cartridge axial thrust load surface.

More specifically with respect to this embodiment, the inner and outer cartridges may include an arrangement wherein the inner cartridge is generally slidably received by and aligned along a common axial center line with the second outer cartridge. The preload ring and the preload surface of the annular groove transpose the axial preload thrust to each of the inner and outer cartridges. Preferably, the preload element includes pressurized oil that can apply a predetermined force per unit distance (i.e., in pounds/inch or grams/millimeter, etc.) to each of the inner cartridge and the outer cartridge. The bearing system may further include an oil discharge port or multiple oil discharge ports in fluid communication with the drain port in the outer cartridge. In this respect, the drain port may be formed in an outer annular relief of the second cartridge. The oil discharge port preferably includes a bore in the center housing of the bearing system and may be fluidly coupled with a reservoir drain for channeling excess oil to an engine sump. Additionally, an annular lubricant feed port may be formed in a squeeze film bearing pad of the outer cartridge.

In an alternative embodiment, the improved bearing system may include a pair of cartridges that include an inner cartridge slidably received by and aligned along a common axial centerline with an outer cartridge, with the inner and outer cartridges having respective bearing units configured to be mountable to a common axial shaft. Here, a drain port is preferably formed in an annular relief in the outer cartridge for discharging excess oil from the bearing system to an oil discharge port in fluid communication therewith. The oil discharge port may include a bore in a center housing of the bearing system and the drain port may include multiple drain ports. The bearing system may further include a reservoir drain coupled to the oil discharge port for channeling excess oil to an engine sump, an annular lubricant feed groove formed in a squeeze film bearing pad of the outer cartridge, and a lubricant reservoir fluidly coupled to a lubricant feed port, the lubricant reservoir being preferably fluidly coupled to the annular lubricant bearing preload chamber. The lubricant feed port may angle inwardly toward one of the bearing units to provide enhance lubrication thereto.

Additionally, the bearing system may include an annular lubricant bearing preload chamber formed between the inner cartridge and the outer cartridge such that pressurized lubricant in the bearing preload chamber axially separates the inner bearing cartridge from the outer bearing cartridge to form a simultaneous axial preload thrust on the inner cartridge and the outer cartridge in inwardly opposite axial directions. This embodiment may also include an annular channel generally formed from the outer cartridge for selectively receiving a preload ring, an annular groove coupled to the inner cartridge and sized to slidably receive the preload ring and a preload element disposed within the annular groove and axially compressed between a preload surface of the annular groove and the preload ring. This allows the preload element to maintain a supplemental and simultaneous axial preload thrust on the inner and outer cartridges and respective bearing units in an inboard axial direction. Preferably, the outer cartridge includes an inner surface complementary diametrically sized to an outer surface of the inner cartridge and the bearing units include an inner race and an outer race housing a set of bearing balls such that at least one of the outer races is integrally formed from a portion of one of the inner or the outer cartridges. In this embodiment, the annular lubricant bearing preload chamber preferably transposes the axial preload thrust to each of the inner and the outer cartridges and respective bearing units.

In another alternative embodiment, the improved bearing system may include the combination of the aforementioned preload element and an annular lubricant bearing preload chamber. In this embodiment, the bearing system similarly includes a pair of axially split and generally cylindrical cartridges that include an inner cartridge slidably received by and aligned along a common axial center line with an outer cartridge. The inner and outer cartridges have respective bearing units configured to be mountable to a common axial shaft. An annular channel generally formed from the outer cartridge is configured to selectively receive the preload ring. As such, the preload ring may be slidably received by an annular groove coupled to the inner cartridge. A preload element (e.g., a spring or the like) disposed within the annular groove is axially compressed between the preload surface of the annular groove and the preload ring. Additionally, at least one annular lubricant feed port is configured to transmit pressurized lubricant to an annular lubricant bearing preload chamber formed between the inner cartridge and the outer cartridge. Pressurized lubricant in the bearing preload chamber acts to axially separate the inner bearing cartridge from the outer bearing cartridge. As such, the combined mechanical force generated by the preload element and the hydraulic-based axial separation of the inner and outer cartridges by the annular lubricant bearing preload chamber maintain dual simultaneous axial preload thrust on the cartridges and respective bearing units.

In this embodiment, the inner and outer cartridges likewise preferably include respective end stops positioned to limit outward axial movement of the respective bearing units. The outer cartridge also includes an inner surface complementary diametrically sized to an outer surface of the inner cartridge and the bearing units include an inner race and an outer race housing a set of bearing balls such that at least one of the outer races is integrally formed from a portion of one of the inner or the outer cartridges. The preload ring and the preload surface are designed to transpose the axial preload thrust to each of the inner and the outer cartridges and respective bearing units. A lubricant reservoir may be fluidly coupled to one or more of the lubricant feed ports that angle inwardly toward at least one of the bearing units. Furthermore, at least one lubricant exit aperture may be coupled to the inner cartridge and positioned to facilitate lubricant flow out from the lubricant bearing preload chamber. Lastly, the aggregate axial preload thrust on the cartridges and the bearing units is calculated as a function of axial displacement of the inner and outer cartridges relative to an opposite compressive force acting on an outer cartridge axial thrust load surface and an inner cartridge axial thrust load surface and the separating force generated by the bearing preload chamber is tuned as a function of the size of the bearing preload chamber and the pressurized lubricant therein.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
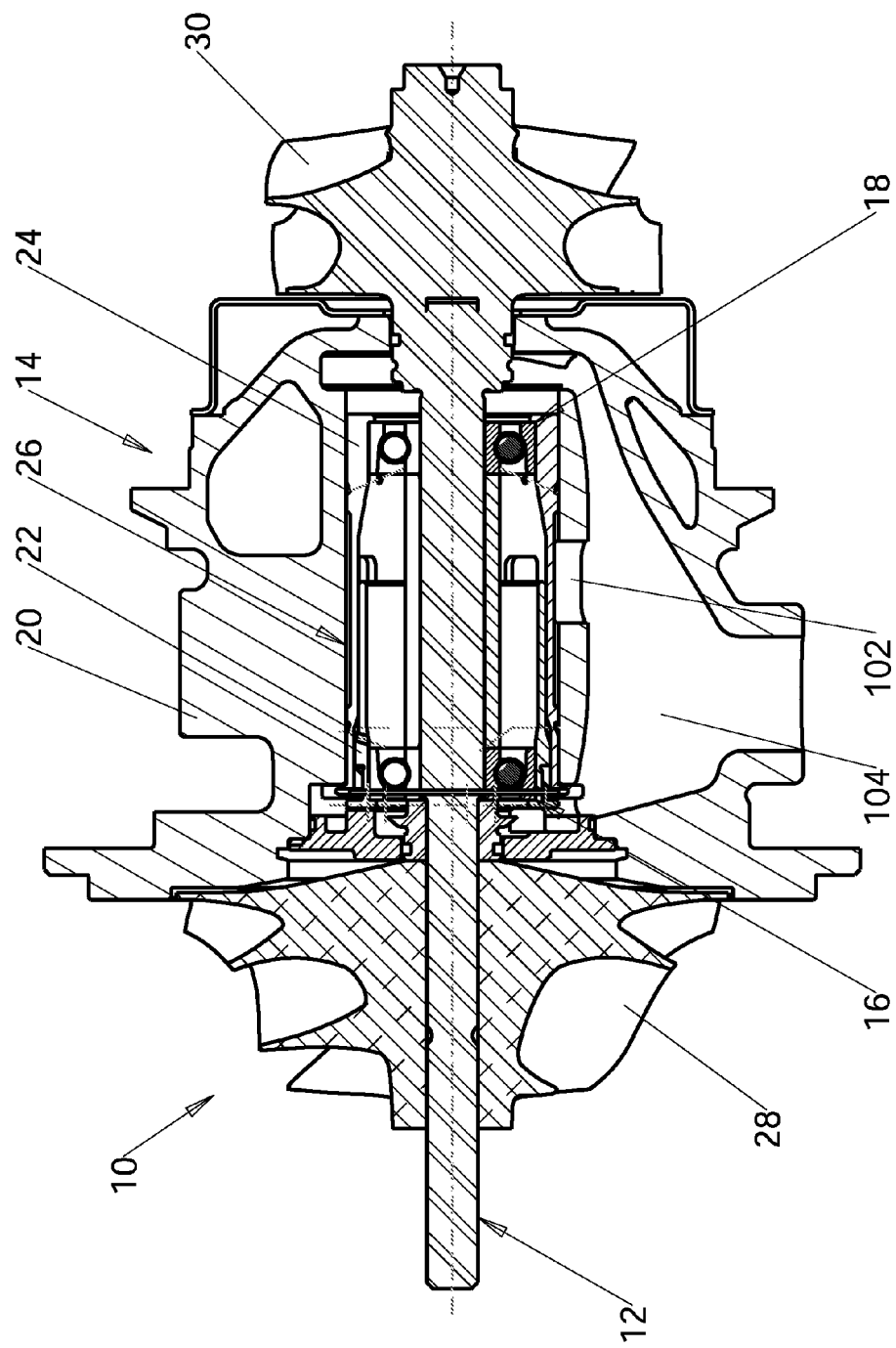
FIG. 1 is cross-sectional view of a portion of a turbocharger taken along a plane through a shaft, wherein the illustrative turbocharger incorporates the improved bearing system disclosed herein.

As shown in the drawings for purposes of illustration, the present invention for an improved bearing system is referred to generally by the reference numeral 10. As shown in FIG. 1, the improved bearing system 10 is provided for rotatably supporting a rotating shaft 12 in high speed machinery such as a turbocharger 14. The bearing system 10 includes a pair of axially spaced angular contact ball bearings or ball bearing units 16, 18 for rotatably supporting the shaft 12 within a housing 20, such as the illustrative turbocharger center housing 20. The angular contact bearing units 16, 18 are carried respectively within a pair of bearing cartridges 22, 24 defining an axially split bearing carrier 26. As shown in FIG. 1, the bearing system 10 is generally a free floating bearing cartridge that, as described in detail below, is not axially pinned into location as are some bearing systems known in the art. As such, the bearing system 10 includes mechanisms for applying axial preload thrust to both of the bearing cartridges 22, 24, which in turn transmit the thrust preload force to the associated angular contact bearing units 16, 18.

The turbocharger 14 shown in FIG. 1 generally includes a compressor wheel or impeller 28 and a turbine wheel 30 mounted at opposite ends of the rotary shaft 12. The turbine wheel 30 is positioned within a turbine housing coupled to an exhaust gas stream from an internal combustion engine (not shown) for rotatably driving the turbine wheel 30 at a relatively high speed. The exhaust gas driven turbine wheel 30 thus rotatably drives the supporting shaft 12 which, in turn, rotatably drives the compressor wheel/impeller 28 at the same relatively high rotational speed. The compressor wheel/impeller 28 is normally positioned within a compressor housing to draw in and compress ambient air to provide a supply of pressurized charge air to the air intake side of the internal combustion engine ("ICE"). This design is considered a closed turbomachine as the charge air deliverable to the air intake side of the ICE is dependent upon a limited supply of exhaust gas generated during combustion. The turbocharger is able to supplement engine performance by compressing air with the compressor wheel/impeller. This compression process is well known to persons skilled in the art.

The turbine and compressor housings are normally mounted onto a common center housing that includes a bearing system for rotatably supporting the common shaft 12 during turbocharger operation. The shaft bearing system supports the shaft 12 throughout a relatively broad range of rotational speeds and transient thrust loads in a relatively hostile exhaust gas and related ICE operating environment which includes broad-range temperature fluctuations and frequent sustained operation at relatively high temperatures. The improved bearing system 10 disclosed herein provides a simplified yet reliable bearing arrangement wherein said bearing system 10 is able to more efficiently operate for longer cycles, under harsher conditions, and at tighter operating tolerances.

Figure 3:
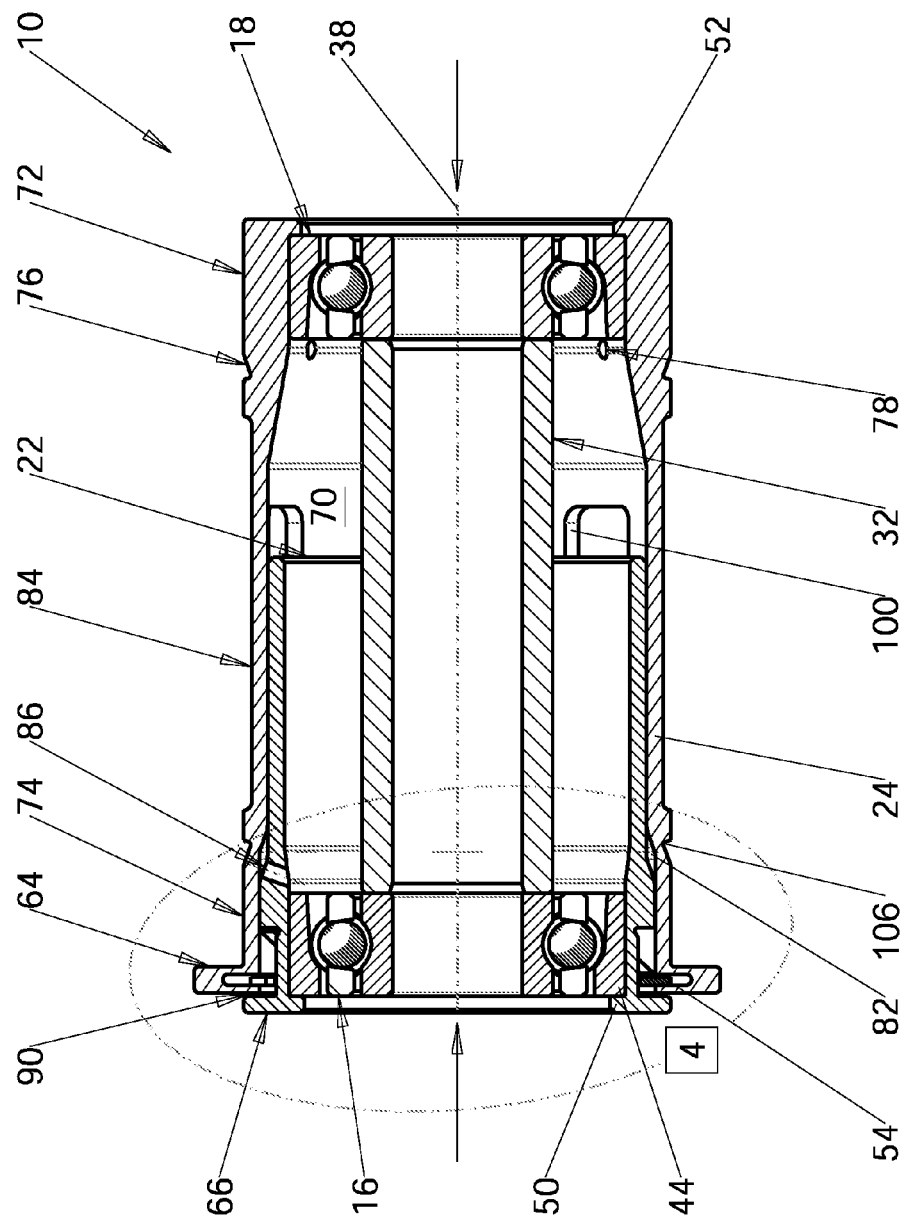
FIG. 3 is a cross-sectional view further illustrating the features of the improved bearing system.

The inner and outer bearing cartridges 22, 24 are generally positioned within the housing 20 (FIG. 1) of the bearing system 10. This allows the bearing system 10 to freely rotate through radial loads that would otherwise cause drag through the angular contact bearing units 16, 18 positioned within the interior of the inner and outer bearing cartridges 22, 24. By allowing the bearing system 10 to freely rotate, the angular contact bearing units 16, 18 rotate at a lower shaft RPM thereby increasing bearing life. Furthermore, such free rotation of the bearing system 10 further permits symmetric load distribution along the axes. A non-pinned bearing system 10, e.g., through deployment of the inner and outer bearing cartridges 22, 24 as shown in FIGS. 1 and 3, simplifies the installation into a turbocharger unit and reduces the risk of fretting in the event the turbocharger cartridges are otherwise pinned. Allowing for axial movement of the inner bearing cartridge 22 relative to the outer bearing cartridge 24, and vice versa, increases the operating efficiency of the turbocharger system over time and reduces failure due to axial rubbing of the compressor wheel/impeller 28 and/or the turbine wheel 30 against adjacent housings, as is problematic in other prior art turbocharger bearing systems.

Figure 2:
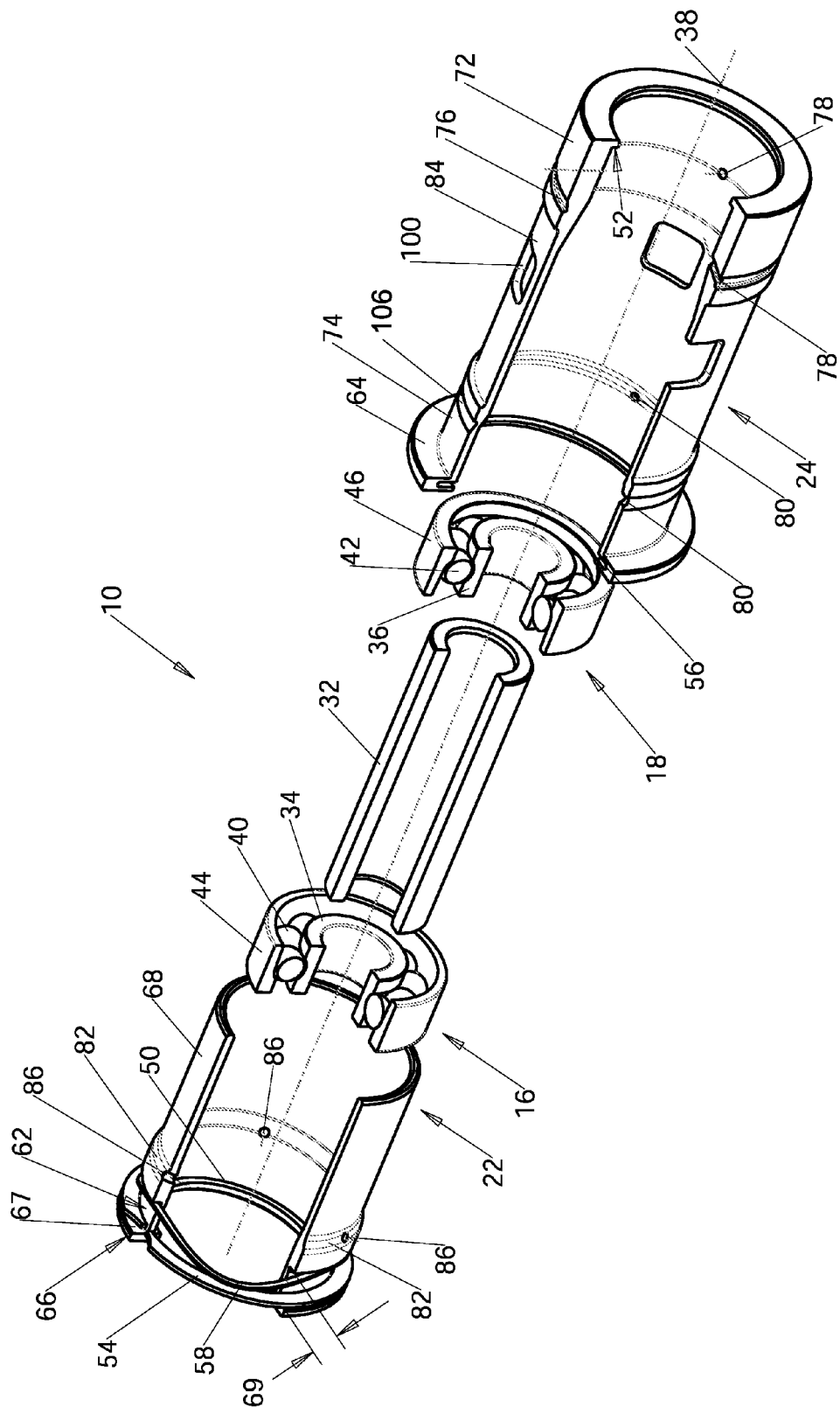
FIG. 2 is an exploded perspective view more specifically illustrating a pair of bearing cartridges, a pair of bearing units and a cartridge inner sleeve, as used with the improved bearing system of FIG. 1.
Figure 4:
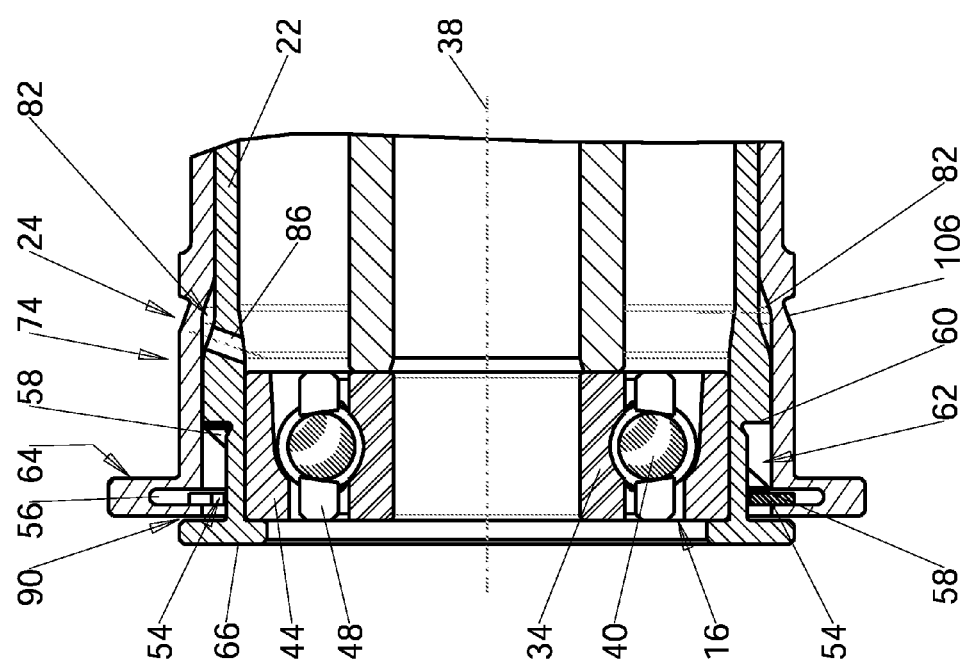
FIG. 4 is an enlarged cross-sectional view taken about the circle 4 in FIG. 3, further illustrating a preload element that imparts an axial preload thrust on each of the bearing cartridges.

FIGS. 2-4 illustrate preferred ways for axially preloading the bearing cartridges 22, 24 and the associated bearing units 16, 18 of the bearing system 10. FIG. 2 is an exploded perspective view showing the bearing system 10 generally including a cartridge inner sleeve 32 axially positioned between the inner bearing cartridge 22 and the outer bearing cartridge 24. The inner sleeve 32 is disposed between a pair of inner bearing races 34, 36 that generally make up a portion of the bearing units 16, 18. The inner sleeve 32 positions the bearing unit 16 in the inner cartridge 22 relative to the bearing unit 18 in the outer cartridge 24. In this respect, the predetermined distance between the bearing units 16, 18 is dictated by the length of the inner sleeve 32. The inner sleeve 32 is diametrically sized to generally align with and abut at least a portion of the inner bearing races 34, 36. This way, the inner bearing races 34, 36 carry at least part of the preload of the axially pre-tensioned shaft 12 that passes through a coaxial center line 38 of the bearing system 10. The effect is that the pre-tensioned shaft 12 keeps the inner bearing races 34, 36 and the inner sleeve 32 tightly axially bound together so that the preload can produce a constrained axial force through the angular contact bearing units 16, 18.

The angular contact bearing units 16, 18 rotationally reside within the interior of the inner and outer bearing cartridges 22, 24, respectively. The bearing units 16, 18 themselves generally include a set of bearing balls 40, 42 positioned between the inner bearing races 34, 36 and a set of outer bearing races 44, 46. In one embodiment, the outer bearing races 44, 46 may be made as part of or integral to the inner bearing cartridge 22 and the outer bearing cartridge 24, respectively. In this embodiment, the outer bearing races 44, 46 are formed to the interior and as part of the inner bearing cartridge 22 and the outer bearing cartridge 24. The inner sleeve 32 is disposed between the inner bearing races 34, 36, as described above, to facilitate predetermined inward axial movement therein of the bearing units 16, 18 due to axial preloading, as described below. Moreover, the inner sleeve 32 preferably aligns the inner bearing races 34, 36 with the integrated or integral outer bearing races 44, 46. This particular embodiment is preferred because it reduces the number of parts of the bearing system 10, thereby simplifying the manufacturing and assembly process.

In an alternative embodiment, each of the outer bearing races 44, 46 may be formed separately from the respective inner and outer bearing cartridges 22, 24. Here again, the inner sleeve 32 is juxtaposed between the inner bearing races 34, 36 to axially position the bearing units 16, 18 at some predefined axial distance from one another. As such, the inner sleeve 32 effectively prevents inward axial movement of the bearing units 16, 18 within the interior of the bearing system 10 beyond the length of the inner sleeve 32. The bearing system 10 may also include an inner cartridge end stop 50 that abuts the outer bearing race 44 as a result of the axial preload. The inner cartridge end stop 50 prevents the outer bearing race 44 from outward axial movement toward the compressor wheel/impeller 28. In essence, the bearing unit 16 is preferably statically axially positioned between one end of the cartridge inner sleeve 32 via engagement with the inner bearing race 34 and the inner cartridge end stop 50 via engagement with the outer bearing race 44. Likewise, an outer cartridge end stop 52 abuts the outer bearing race 46 as a result of the axial preload. The outer cartridge end stop 52 prevents the outer bearing race 46 from outward axial movement toward the turbine wheel 30. In essence, the bearing unit 18 is also preferably statically axially positioned between the other end of the cartridge inner sleeve 32 via engagement with the inner bearing race 36 and the outer cartridge end stop 52 via engagement with the outer bearing race 46. The end stops 50, 52 work in conjunction with the inner sleeve 32 to tightly axially position the bearing units 16, 18 and the bearing cartridges 22, 24 during non-use (e.g., as a result of the axial preload), and during operation.

In an alternative embodiment, the angular contact bearing units 16, 18 may be of a hybrid construction. That is, the outer bearing race 44 of the bearing unit 16 could be formed integral to the interior of the inner bearing cartridge 22 while the outer bearing race 46 of the bearing unit 18 could be formed separately from the outer bearing cartridge 24, or vice versa. In such a hybrid embodiment, the inner sleeve 32 still axially positions each of the inner bearing races 34, 36 at some predefined position from one another to maintain the predetermined distance between the bearing units 16, 18 within the inner and outer bearing cartridges 22, 24. The bearing units 16, 18 can also be sized differently relative to each other depending on the externally imparted rotor dynamic loads that are imparted through the shaft 12 running through the coaxial center line 38 of the bearing system 10. The outer bearing races 44, 46 and the inner bearing races 34, 36 are preferably made from a metallic material and the bearing balls 40, 42 are preferably constructed from a ceramic material to enhance durability and longevity.

Additionally, the bearing units 16, 18 may include a bearing cage 48 as shown in FIG. 4. The bearing cage 48 is an optional accessory for use in association with the angular contact bearing units 16, 18. The bearing cage 48 is positioned to encase the bearing balls 40, 42 to tangentially stabilize movement within the bearing units 16, 18. Increased stability may increase efficiency and performance when the bearing units 16, 18 come under pre-load. Additionally, increased stability generally requires fewer bearing balls 40, 42 to achieve similar performance. In one embodiment, tangential stabilization may be achieved with the bearing cage 48 through deployment of a sliding convex surface in a matched concave surface constructed to avoid dents in the bearing balls 40, 42. This particular feature may also reduce the friction in the bearing units 16, 18. If the bearing cage 48 is not used, the bearing balls 40, 42 reside as a full complement bearing group. Given the thermal limitations of current materials used for the bearing cage 48, the bearing system 10 can include the bearing cage 48 in either or both of the bearing units 16, 18. For example, the bearing system 10 may use one bearing cage 48 for one of the bearing units 16, 18 in the event one of the bearing units 16, 18 is in a temperature region that exceeds the thermal properties of the bearing cage 48. Here, a full complement bearing group would be used in the high temperature region, instead of the bearing cage 48, and the bearing cage 48 would be used in association with the bearing unit operating in the relatively lower temperature region.

One particularly desirable aspect of the bearing system 10 is its ability to accomplish simultaneous axial pre-loading of the bearing units 16, 18 and the bearing cartridges 22, 24 in opposite inboard directions. In this respect, FIGS. 2-4 illustrate the bearing system 10 including a preload ring 54 held captive in an outer annular preload ring channel 56 formed from a portion of the outer bearing cartridge 24. The preload ring 54 carries the axial load from a preload element 58, such as an annular or ring-shaped wave spring, through the preload annular ring channel 56. The preload ring 54 is metallic in construction and is preferably a material that can be tempered with spring steel characteristics. The axial preload generated by the preload element 58 is applied to a preload surface 60 (FIG. 4) formed as part of an annular groove 62. The annular groove 62 facilitates axial movement of the preload ring 54, which is otherwise located within the preload ring channel 56 of the outer cartridge 24. Such movement enables the inner cartridge 22 to move axially relative to the outer cartridge 24. In this case, the inner cartridge 22 and the outer cartridge 24 experience simultaneous inboard movement as a result of compressing the preload element 58 between the preload surface 60 and the preload ring 54. The pressure exerted on the preload surface 60 generally causes the inner bearing cartridge 22 to move inwardly (generally left-to-right per the illustrations in FIGS. 2-3) toward engagement with the outer bearing sleeve 24; and the pressure exerted within the annular preload ring channel 56 via the preload ring 54 generally causes the outer bearing cartridge 24 to move inwardly (generally right-to-left per the illustrations in FIGS. 2-3) toward engagement with the inner bearing sleeve 22. The annular groove 62 allows the preload element 58 to reside therein and apply an axial load to both the preload ring 54 and the preload surface 60. The preload force applied by the preload element 58 is a function of displacement versus compressive force, which determines the net preload force applied through to the bearing units 16, 18. Of course, such a ratio is dependent upon the dynamic load carrying characteristics of the bearing system 10.

The preload element 58 generally generates a consistent preload force thrust on the inner and outer cartridges 22, 24, of which such force translates through to the bearing units 16, 18 and, specifically, the inner bearing races 34, 36, the bearing balls 40, 42, and the outer bearing races 44, 46. As such, this preload force thrust prevents the bearing balls 40, 42 from skipping in the bearing races 34, 36, 44, 46 during operation. Preventing skipping reduces wear and prolongs the operating life of the bearing units 16, 18. Additionally, spool up time of the bearing system 10 derogates less over time given that the bearing units 20, 22 are under preload through the entire operating range. Applying a preload through the bearing units 16, 18 also eliminates nearly all axial play in the bearing system 10. As a result, the bearing system 10 can be manufactured with tighter operating clearances. In turbocharger applications, this allows for tighter axial clearances between the housing shroud lines of the compressor wheel/impeller 28 and the housing shroud lines of the turbine wheel 30. Additionally, operating tighter clearances between the housing of the compressor wheel/impeller 28 and the housing of the turbine wheel 30 improves aerodynamic efficiencies that result in improved performance and efficiency for internal combustion engines integrated with turbochargers that include the bearing system 10 disclosed herein.

As mentioned above, the annular preload ring channel 56 captures the preload ring 54 to facilitate axial preloading of the bearing cartridges 22, 24 and the bearing units 16, 18. The depth of the annular preload ring channel 56 is somewhat larger than the outer diameter of the preload ring 54, as best shown in FIG. 4. In this respect, the annular preload ring channel 56 is specifically sized to allow the preload ring 54 to expand diametrically outwardly into this larger diameter channel during assembly and disassembly procedures. This allows the preload ring 54 to be displaced from the load bearing surface to facilitate removal. Although, as shown in FIG. 4, the annular preload ring channel 56 still provides a sufficient load bearing surface for the preload ring 54 as a result of axial loads applied by the preload element 58 during use. With respect to placement of the preload ring 54 relative to the inner bearing cartridge 22, the annular groove 62 is formed along the outer diameter thereof between the preload surface 60 and an interior flange surface 67 opposite the axial thrust load surface 66. In this respect, the annular groove 62 generally includes a gap 69 formed between the outwardly projecting preload surface 60 and the interior flange surface 67. This gap 69, as best shown in FIG. 2, allows the preload ring 54 to move axially relative to the inner bearing cartridge 22 and can be sized to achieve a specific preload force from the preload element 58. As such, the non-pinned bearing cartridges 22, 24 may move axially relative to one another, depending on the force applied by the preload element 58; or the forces generated by the lubricant preloading system, as described in more detail below. The preload element 58 can be sized to provide a specific preload (i.e., spring rate) to the bearing system 10 depending on the desired application. Additionally, the annular groove 62 may be specifically sized to facilitate removal of the preload ring 54 during disassembly procedures.

The preload element 58 residing within the annular groove 62 is preferably compressed between the preload surface 60 and the preload ring 54, which preferably abuts the interior flange surface 67. The preload forces are translated through to the bearing cartridges 22, 24 and the respective bearing units 16, 18 via the flange surface 67. As such, the bearing cartridges 22, 24 are simultaneously biased toward each other along the coaxial center line 38, thereby exerting a preload force on the angular contact bearing units 16, 18. This occurs, in part, because the annular groove 62 houses the preload ring 54 and the preload element 58 and allows the compressed elastic preload element 58 to be biased between the surfaces 60, 67 (via the preload ring 54). When the inner and outer bearing cartridges 22, 24 move inwardly along the directional arrows shown in FIG. 3, the inner cartridge end stop 50 positively locates the outer bearing race 44 of the bearing unit 16 at an exact axial distance from the axial thrust load surface 66. Likewise, the outer cartridge end stop 52 positively locates the outer bearing race 46 of the bearing unit 18 at an exact axial distance from the outer cartridge axial thrust load surface 64. As such, the bearing system 10 is axially positioned by constraining the inner cartridge axial thrust load surface 66 relative to the outer cartridge axial thrust load surface 64. In this respect, the outer cartridge axial thrust load surface 64 provides a load bearing surface when axial loads are applied to the bearing unit 18 and the inner cartridge axial thrust load surface 66 provides a load bearing surface when axial loads are applied to the bearing unit 16.

As briefly mentioned above, the inner and outer bearing cartridges 22, 24 are able to make use of tighter tolerances in view of integrating the bearing system 10 disclosed herein. In this respect, the inner bearing cartridge 22 includes an outer surface 68 diametrically sized to provide a design specific diametrical fit with an inner surface 70 of the outer bearing cartridge 24. This diametrical fit between the inner and outer surfaces 68, 70 are defined through analytical results that are dependent upon the application of the bearing system 10 and the physical properties of the lubricating agent used in association with the system 10. Furthermore, the inner bearing cartridge 22, the outer bearing cartridge 24, the inner sleeve 32, the inner bearing races 34, 36, the bearing balls 40, 42, and the outer bearing races 44, 46 are each preferably produced from metallic or ceramic materials depending, of course, on the application. Materials that may be machined to tighter tolerances are also particularly preferred. Additionally, ceramic materials are particularly preferred if the bearing system 10 requires low thermal expansion characteristics to minimize heat transfer between components and increase operating life.

Figure 5:
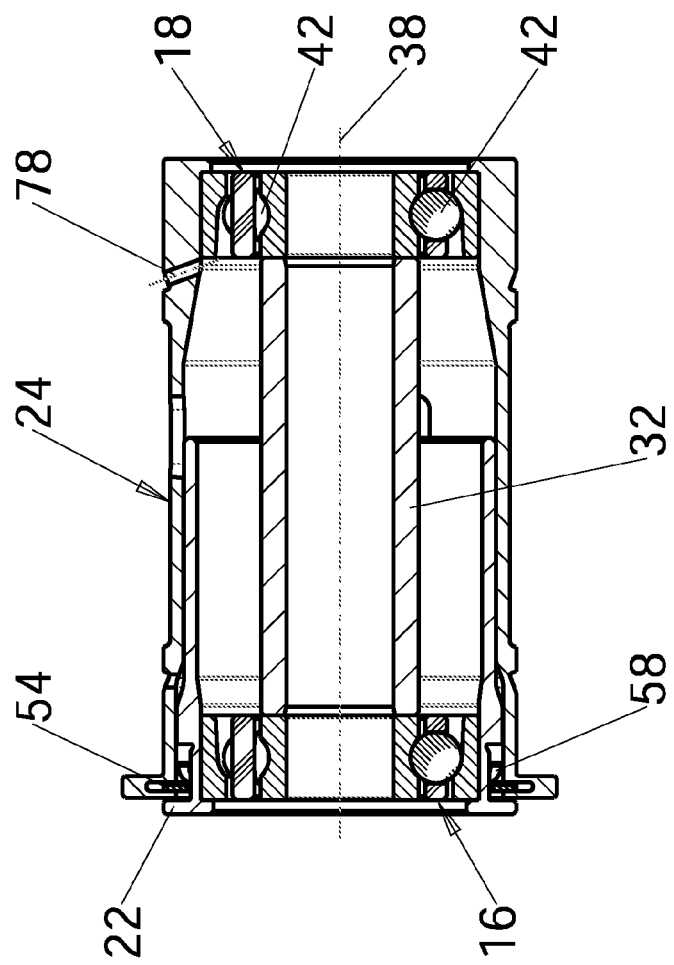
FIG. 5 is an alternative cross-sectional view similar to FIG. 3.

Squeeze film damping is another feature that can increase the dynamic stability of the bearing system 10. In this respect, the outer bearing cartridge 24 includes a pair of squeeze film bearing pads 72, 74 that may be the same size or diametrically sized uniquely from one another to allow for independent tuning of squeeze film dampening at either end of the outer bearing cartridge 24. An annular lubricant feed groove 76 provides an annular reservoir of lubricant to be supplied to a set of lubricant feeds 78 disposed intermittently within the lubricant feed groove 76, as generally shown in FIG. 2. The plurality of lubricant feeds 78 preferably angle inwardly toward the bearing unit 18, as best shown in FIG. 5, to deliver lubricant directly to the bearing balls 42. Additionally, a set of lubricant feeds 80 (FIGS. 2 and 4) may be intermittently disposed circumferentially around the squeeze film bearing pad 74. Part of the lubricant provided to the squeeze film bearing pad 74 may enter an annular lubricant bearing preload chamber 82. From there, said lubricant travels from the annular lubricant bearing preload chamber 82, through one or more of a set of inner bearing cartridge lubricant feeds 86, for delivery to the bearing unit 16. The lubricant feeds 86 in the inner cartridge 22 are similar to the lubricant feeds 78 in the outer bearing cartridge 24 in that the lubricant feeds 86 preferably angle inwardly toward the bearing unit 16 to deliver lubricant to the bearing balls 40. An outer cartridge annular relief 84 (FIGS. 2 and 3) may further provide a reservoir for lubricant to bifurcate annularly around the outer bearing cartridge 24 and flow axially outwardly across the squeeze film bearing pads 72, 74 and to the outer axial edges of the outer bearing cartridge 22. This lubricant may provide the supply of lubricant that feeds to the bearing balls 40, 42 as described above.

Figure 6:
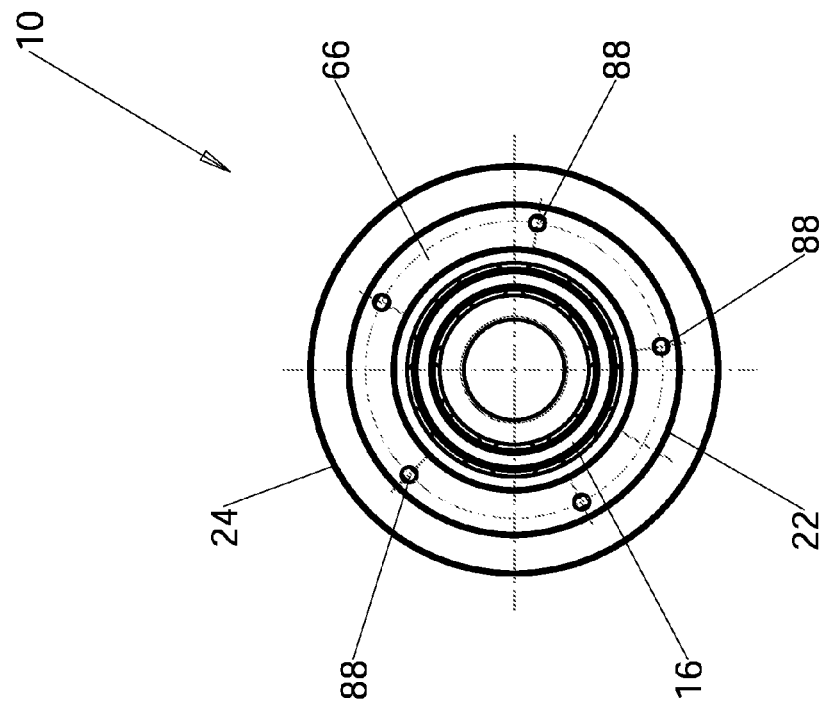
FIG. 6 is an end view of the improved bearing system of FIG. 1, illustrating a plurality of lubricant apertures used as conduits to facilitate continuous flow lubrication throughout the improved bearing system.

Additionally, as shown in the end view of FIG. 6, the inner cartridge axial thrust load surface 66 generally includes a plurality of lubricant apertures 88. Lubricant flowing through these apertures 88 is from pressurized lubricant in the bearing preload chamber 82. In this respect, as described above, the bearing preload chamber 82 is energized by lubricant from the outer cartridge 24. Such lubricant enters into the plurality of lubricant feeds 80 circumferentially disposed along the squeeze film bearing pad 74, as shown in FIG. 2, for eventual delivery to the annular lubricant bearing preload chamber 82. As lubricant under pressure enters the bearing preload chamber 82, the inner bearing cartridge 22 and the outer bearing cartridge 24 tend to axially separate from each other (in a piston effect). The separating force generated by such a hydraulic axial thrust load in the bearing preload chamber 82 can be tuned as a function of the cavity size of the bearing preload chamber 82 and/or the pressure of the lubricant being applied. From there, pressurized lubricant from the bearing preload chamber 82 is delivered to the annular groove 62. Pressurized lubricant in the annular groove 62 likewise may supplement the axial preload of the preload element 58. That is, the pressurized lubricant generally exerts an axial force along the interior flange surface 67 and the preload surface 60 having respective vector components commensurate with the axial preload force vector generated by the preload element 58 at the surface 67 (via the preload ring 54) and the preload surface 60. The groove 62 can be sized to provide a specific preload force that is a function of oil pressure to surface area. The lubricant eventually exits the bearing system 10 out through the lubricant apertures 88. The axial preload generated by the lubricant in the bearing preload chamber 82 may supplement the bearing preload applied by the combination of the preload element 58 in association with the preload ring 54 and the preload surface 60 of the annular groove 62.

Thus, the bearing preload chamber 82 may work separately from or in conjunction with the preload element 58 in providing an axial preload thrust to the bearing units 16, 18 and the bearing cartridges 22, 24. Independent operation occurs when lubrication is not supplied internally to the bearing preload chamber 82 under pressure; and bearing preload is provided solely by the preload element 58 during static and dynamic operating of the bearing system 10. When operating in conjunction with each other, the preload element 58 provides bearing preload during the static and dynamic operation and lubricant is supplied to the bearing preload chamber 82 under pressure. The pressurized lubricant in the bearing preload chamber 82 supplements the axial preload already provided by the preload element 58. In conditions where lubricant pressure can rise as a function of increased operating conditions, thereby increasing in external axial loads being applied to the bearing system 10, the rise in lubrication pressure will result in greater internal axial preload to the angular bearing units 16, 18 which will offset the external axial thrust load and prevent the angular contact bearing units 16, 18 from experiencing thrust load reversal.

Additionally, the clearance of a lubricant bypass gap 90 (FIG. 4) can be set based on the assembled dimensional stack-up dimensions between the inner bearing cartridge 22 and the outer bearing cartridge 24. The lubricant bypass gap 90 is a tunable clearance that controls the amount of lubricant that passes through the lubricant holes 88 (FIG. 6). The size of the gap 90 is dependent upon the dynamic loads imparted to the bearing system 10. Decreasing the size of the gap 90 increases the flow rate of lubricant through the lubricant apertures 88, while increasing the size of the gap 90 decreases the flow rate of lubricant through the lubricant apertures 88. Lubricant that flows through lubricant apertures 88 provides squeeze film dampening and a lubricating film to compensate for axial thrust loads against the inner cartridge axial thrust load surface 66. Furthermore, it provides a continuous path of lubricant to maintain flow characteristics.

Figure 7:
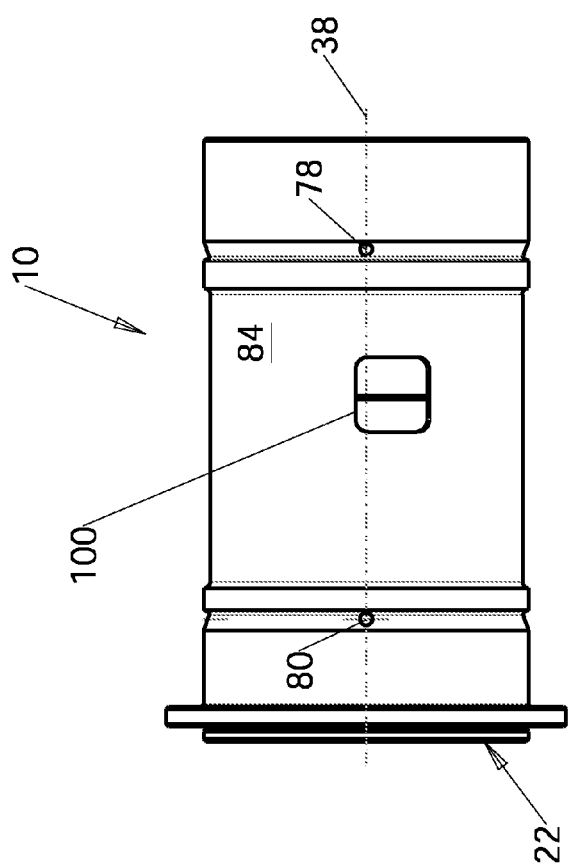
FIG. 7 is a side view of the improved bearing system of FIG. 1.

The bearing system 10 may also include at least one drain port 100 formed in the outer bearing cartridge 24 as generally shown in FIGS. 2, 3 and 7. Specifically, FIG. 2 illustrates three of such drain ports 100 formed in the outer cartridge annular relief 84 of the outer bearing cartridge 24. The drain port 100 allows excess oil build-up within the bearing system 10 to discharge out into the center housing 20 (FIG. 1) through an as cast discharge port 102 for flow into an oil reservoir drain 104 that channels the excess oil to an oil sump (not shown) for recirculation and reuse. Of course, the number and size (e.g., relatively square as shown) of the drain ports 100 may vary depending on the desired use and/or application to control excess oil build-up within the bearing system 10. Moreover, the drain port 100 may or may not be included in the outer bearing cartridge 24, depending on the application of the bearing system 10. Although, if the drain port 100 is included in the bearing system 10, then the discharge port 102 also needs to be included. Alternatively, if the bearing system 10 does not include the drain port 100, the discharge port 102 is optional (i.e., the discharge port 102 may or may not be included in the bearing system 10). The bearing system 10 may also include an additional annular lubricant feed groove 106 (similar to the annular lubricant feed groove 76) that provides an annular reservoir of lubricant to be supplied to the set of lubricant feeds 80 disposed intermittently within the lubricant feed groove 106, as generally shown in FIG. 2.

Although several embodiments of the present invention have been described in detail for purposes of illustration, various modifications of each may be made without departing from the spirit and scope of the invention. Accordingly, the invention is not to be limited, except by the appended claims.

What is claimed is:

1. An improved bearing system, comprising:
    an inner cartridge and an outer cartridge, each of said cartridges having respective bearing units configured to be mountable to a common axial shaft;
    a drain port formed in the outer cartridge for discharging excess oil from the bearing system;
    an annular channel generally formed from one of the inner cartridge or the outer cartridge for selectively receiving a preload ring;
    an annular groove coupled to the other of the inner cartridge or the outer cartridge and sized to receive the preload ring; and
    a preload element disposed within the annular groove and axially compressed between the preload ring and a preload surface of the annular groove such that said preload element maintains a simultaneous axial preload thrust on the inner cartridge and the outer cartridge in inwardly opposite axial directions.

2. The bearing system of claim 1, including an oil discharge port in fluid communication with the drain port.

3. The bearing system of claim 2, wherein the oil discharge port comprises a bore in a center housing of the bearing system.

4. The bearing system of claim 2, including a reservoir drain coupled to the oil discharge port for channeling excess oil to an engine sump.

5. The bearing system of claim 1, wherein the drain port is formed in an annular relief of the outer cartridge.

6. The bearing system of claim 5, wherein the drain port comprises multiple drain ports.

7. The bearing system of claim 1, including an annular lubricant feed groove formed in a squeeze film bearing pad of the outer cartridge.

8. The bearing system of claim 1, wherein the outer cartridge generally slidably receives the inner cartridge along a common axial center line.

9. The bearing system of claim 1, wherein the axial preload thrust comprises an inboard axial preload thrust.

10. The bearing system of claim 1, wherein the preload ring and the preload surface of the annular groove transpose the axial preload thrust to each of the inner cartridge and the outer cartridge.

11. The bearing system of claim 1, wherein the preload element comprises pressurized oil.

12. An improved bearing system, comprising:
a pair of cartridges comprising an inner cartridge slidably received by and aligned along a common axial center line with an outer cartridge, the inner and outer cartridges having respective bearing units configured to be mountable to a common axial shaft;
a drain port formed in an annular relief in the outer cartridge for discharging excess oil from the bearing system to an oil discharge port in fluid communication therewith; and
an annular lubricant bearing preload chamber formed between the inner cartridge and the outer cartridge such that pressurized lubricant in the bearing preload chamber axially separates the inner bearing cartridge from the outer bearing cartridge to form a simultaneous axial preload thrust on the inner cartridge and the outer cartridge in inwardly opposite axial directions.

13. The bearing system of claim 12, wherein the oil discharge port comprises a bore in a center housing of the bearing system and the drain port comprises multiple drain ports.

14. The bearing system of claim 12, including a reservoir drain coupled to the oil discharge port for channeling excess oil to an engine sump.

15. The bearing system of claim 12, including at least one annular lubricant feed groove formed in a squeeze film bearing pad of the outer cartridge.

16. The bearing system of claim 12, including a lubricant reservoir fluidly coupled to a lubricant feed port fluidly coupled to the annular lubricant bearing preload chamber.

17. The bearing system of claim 16, wherein the lubricant feed port angles inwardly toward one of the bearing units.

18. The bearing system of claim 12, including:
an annular channel generally formed from the outer cartridge for selectively receiving a preload ring;
an annular groove coupled to the inner cartridge and sized to slidably receive the preload ring; and
a preload element disposed within the annular groove and axially compressed between a preload surface of the annular groove and the preload ring such that said preload element maintains a simultaneous and supplemental axial preload thrust on the cartridges and respective bearing units in an inboard axial direction.

19. The bearing system of claim 12, wherein the outer cartridge includes an inner surface complementary diametrically sized to an outer surface of the inner cartridge and the bearing units include an inner race and an outer race housing a set of bearing balls such that at least one of the outer races is integrally formed from a portion of one of the inner or the outer cartridges.

20. The bearing system of claim 12, wherein the annular lubricant bearing preload chamber transposes the axial preload thrust to each of the inner and the outer cartridges and respective bearing units.

* * * * *